US011720792B2

(12) United States Patent
Taylor et al.

(10) Patent No.: US 11,720,792 B2
(45) Date of Patent: Aug. 8, 2023

(54) DEVICES AND METHODS FOR REINFORCEMENT LEARNING VISUALIZATION USING IMMERSIVE ENVIRONMENTS

(71) Applicant: ROYAL BANK OF CANADA, Toronto (CA)

(72) Inventors: Matthew Edmund Taylor, Edmonton (CA); Bilal Kartal, Edmonton (CA); Pablo Francisco Hernandez Leal, Edmonton (CA); Nathan Douglas, Calgary (CA); Dianna Yim, Calgary (CA); Frank Maurer, Calgary (CA)

(73) Assignee: ROYAL BANK OF CANADA, Toronto (CA)

( * ) Notice: Subject to any disclaimer, the term of this patent is extended or adjusted under 35 U.S.C. 154(b) by 517 days.

(21) Appl. No.: 16/944,420

(22) Filed: Jul. 31, 2020

(65) Prior Publication Data

US 2021/0034974 A1 Feb. 4, 2021

Related U.S. Application Data

(60) Provisional application No. 62/881,033, filed on Jul. 31, 2019.

(51) Int. Cl.
*G06N 3/00* (2023.01)
*G06N 3/08* (2023.01)
(Continued)

(52) U.S. Cl.
CPC ............... *G06N 3/08* (2013.01); *G06N 3/006* (2013.01); *G06N 3/092* (2023.01)

(58) Field of Classification Search
None
See application file for complete search history.

(56) References Cited

U.S. PATENT DOCUMENTS 11,106,211 B2 * 8/2021 Chiang .................. G06N 3/006
11,210,585 B1 * 12/2021 Heess ...................... G06N 3/08
(Continued)

OTHER PUBLICATIONS

A. Adadi and M. Berrada, Peeking Inside the Black-Box: a Survey on Explainable Artificial Intelligence (XAI). IEEE Access 6 (2018), 52138-52160. DOI: http://dx.doi.org/10.1109/ACCESS.2018.2870052.

(Continued)

*Primary Examiner* — Martin Mushambo
(74) *Attorney, Agent, or Firm* — Norton Rose Fulbright Canada LLP

(57) ABSTRACT

Disclosed are systems, methods, and devices for generating a visualization of a deep reinforcement learning (DRL) process. State data is received, reflective of states of an environment explored by an DRL agent, each state corresponding to a time step. For each given state, saliency metrics are calculated by processing the state data, each metric measuring saliency of a feature at the time step corresponding to the given state. A graphical visualization is generated, having at least two dimensions in which: each feature of the environment is graphically represented along a first axis; and each time step is represented along a second axis; and a plurality of graphical markers representing corresponding saliency metrics, each graphical marker having a size commensurate with the magnitude of the particular saliency metric represented, and a location along the first and second axes corresponding to the feature and time step for the particular saliency metric.

20 Claims, 13 Drawing Sheets

(51) Int. Cl.
*G06N 3/006* (2023.01)
*G06N 3/092* (2023.01)

(56) References Cited

U.S. PATENT DOCUMENTS

| | | | | |
|---|---|---|---|---|
| 11,488,024 | B1* | 11/2022 | Regan | G06N 3/045 |
| 2006/0195227 | A1* | 8/2006 | Sabe | G05B 13/021 |
| | | | | 700/245 |
| 2015/0100530 | A1* | 4/2015 | Mnih | G06N 3/08 |
| | | | | 706/25 |
| 2017/0337682 | A1* | 11/2017 | Liao | G06T 7/30 |
| 2019/0184561 | A1* | 6/2019 | Yip | B25J 9/163 |
| 2019/0232488 | A1* | 8/2019 | Levine | B25J 9/163 |
| 2019/0258918 | A1* | 8/2019 | Wang | G06N 3/088 |
| 2019/0321974 | A1* | 10/2019 | Leon | B25J 9/1661 |
| 2019/0385022 | A1* | 12/2019 | Jang | G06F 18/214 |
| 2020/0061811 | A1* | 2/2020 | Iqbal | B25J 9/161 |
| 2020/0175364 | A1* | 6/2020 | Xu | G06N 3/08 |
| 2020/0342968 | A1* | 10/2020 | Avinash | A61B 5/7267 |
| 2022/0193895 | A1* | 6/2022 | Leon | B25J 9/1612 |

OTHER PUBLICATIONS

Sam Greydamus, Anurag Koul, Jonathan Dodge, and Alan Fern, Visualizing and Understanding Atari Agents, CoRR abs/1711.00138 (2017), http://arxiv.org/abs/1711.00138.

L. Itti, C. Koch, and E. Niebur, A model of saliency-based visual attention for rapid scene analysis. IEEE Transactions on Pattern Analysis and Machine Intelligence 20, 11 (Nov. 1998), 1254-1259, DOI:http://dx.doi.org/10.1109/34.730558.

O. Kwon, C. Muelder, K. Lee, and K. Ma, A Study of Layout, Rendering, and Interaction Methods for Immersive Graph Visualization. IEEE Transactions on Visualization and Computer Graphics 22, 7 (Jul. 2016), 1802-1815. DOI: http://dx.doi.org/10.1109/TVCG.2016.2520921.

Volodymyr Mnih et al., Asynchronous Methods for Deep Reinforcement Learning. CoRR abs/1602.01783 (2016), http://arxiv.org/abs/1602.01783.

Volodymyr Mnih et al., Human-level control through deep reinforcement learning. Nature 518 (Feb. 25, 2015), 529 EP -, https://doi.org/10.1038/nature14236.

Cinjon Resnick et al., Pommerman: a Multi-Agent Playground. CoRR abs/1809.07124 (2018), http://arxiv.org/abs/1809.07124.

G. K. L. Tam et al., An Analysis of Machine- and Human-Analytics in Classification. IEEE Transactions on Visualization and Computer Graphics 23, 1 (Jan. 2017), 71-80. DOI: http://dx.doi.org/10.1109/TVCG.2016.2598829.

W. Usher et al., A Virtual Reality Visualization Tool for Neuron Tracing. IEEE Transactions on Visualization and Computer Graphics 24, 1 (Jan. 2018), 994-1003. DOI: http://dx.doi.org/10.1109/TVCG.2017.2744079.

J. Wang et al., DQNViz: a Visual Analytics Approach to Understand Deep Q-Networks. IEEE Transactions on Visualization and Computer Graphics 25, 1 (Jan. 2019), 288-298. DOI: http://dx.doi.org/10.1109/TVCG.2018.2864504.

* cited by examiner

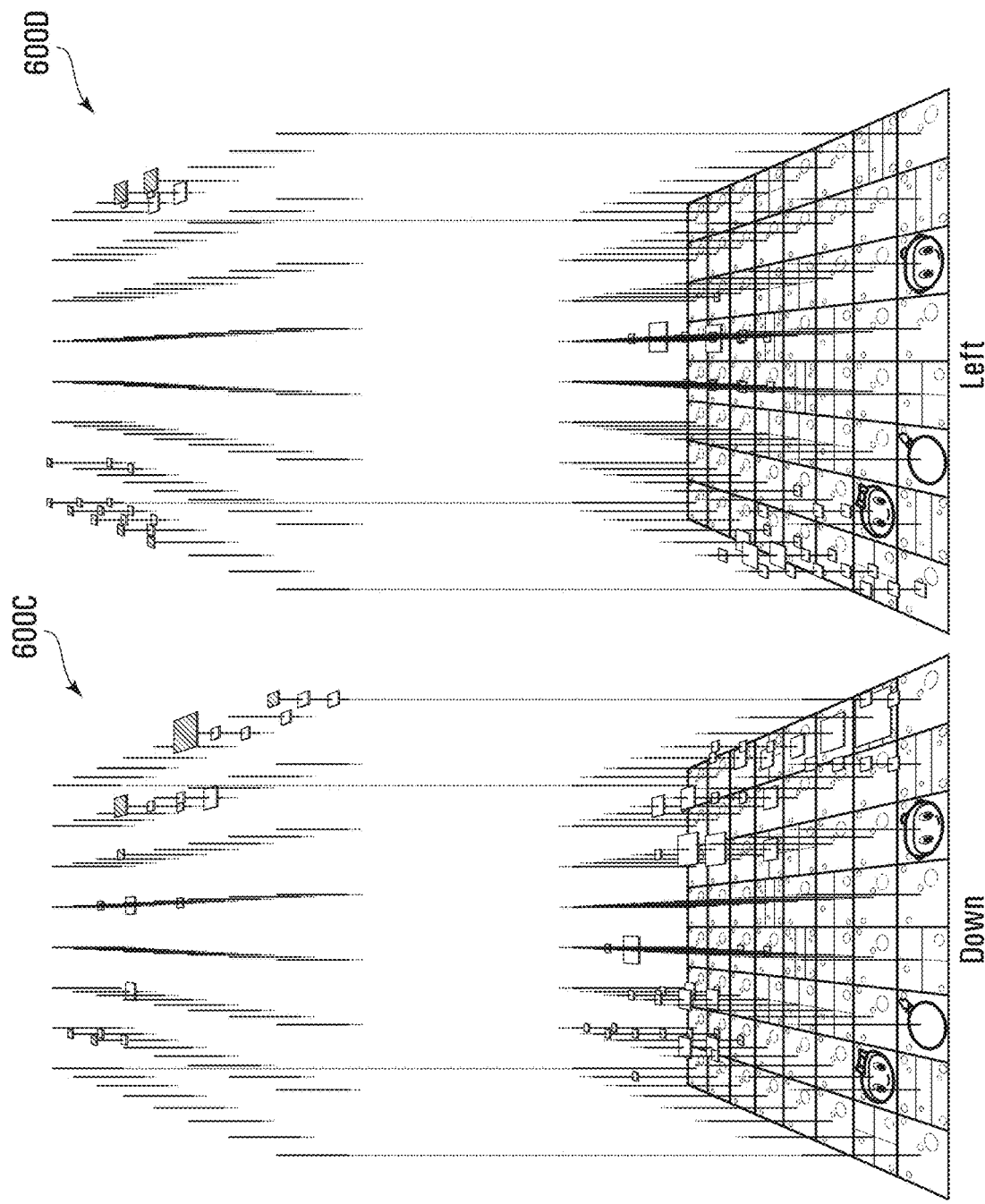

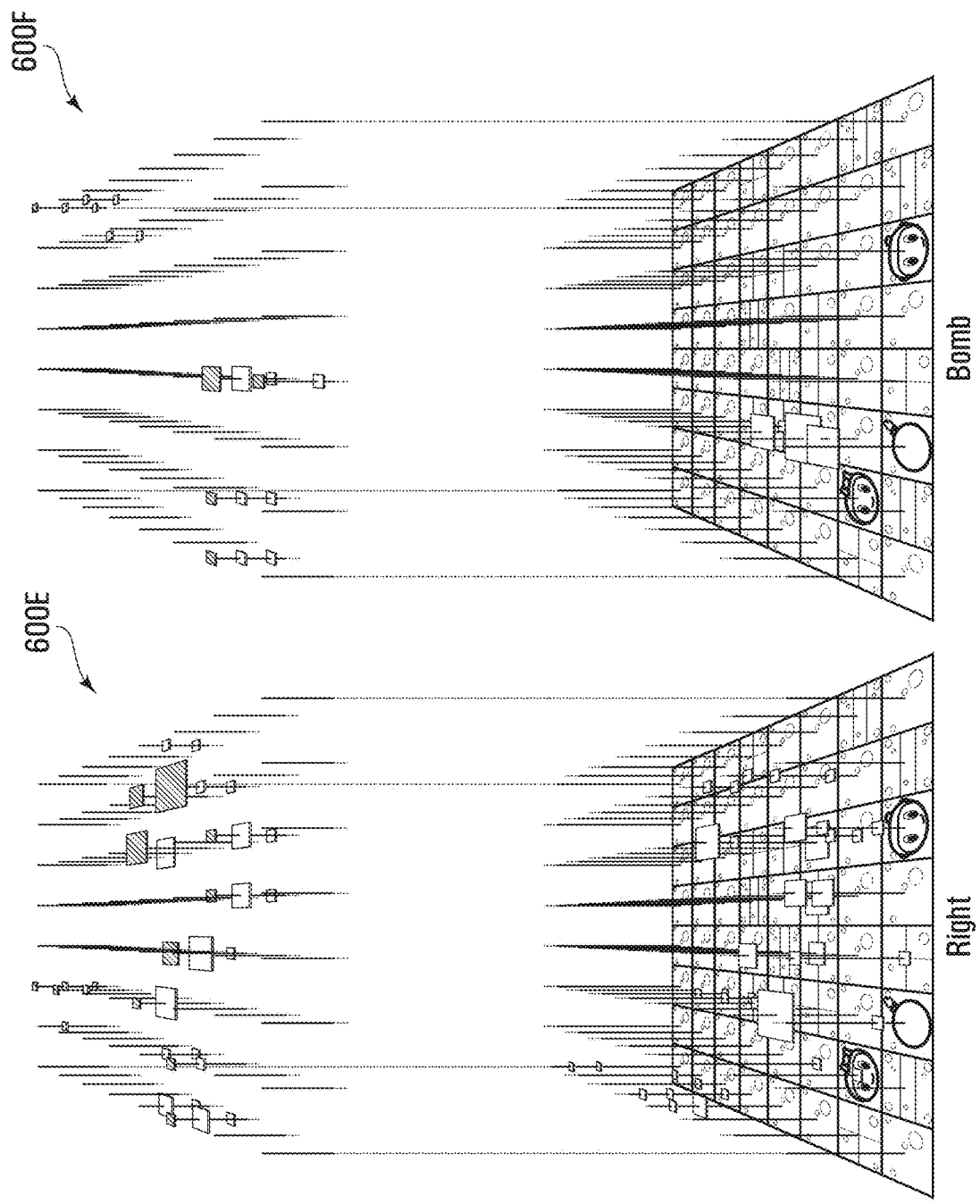

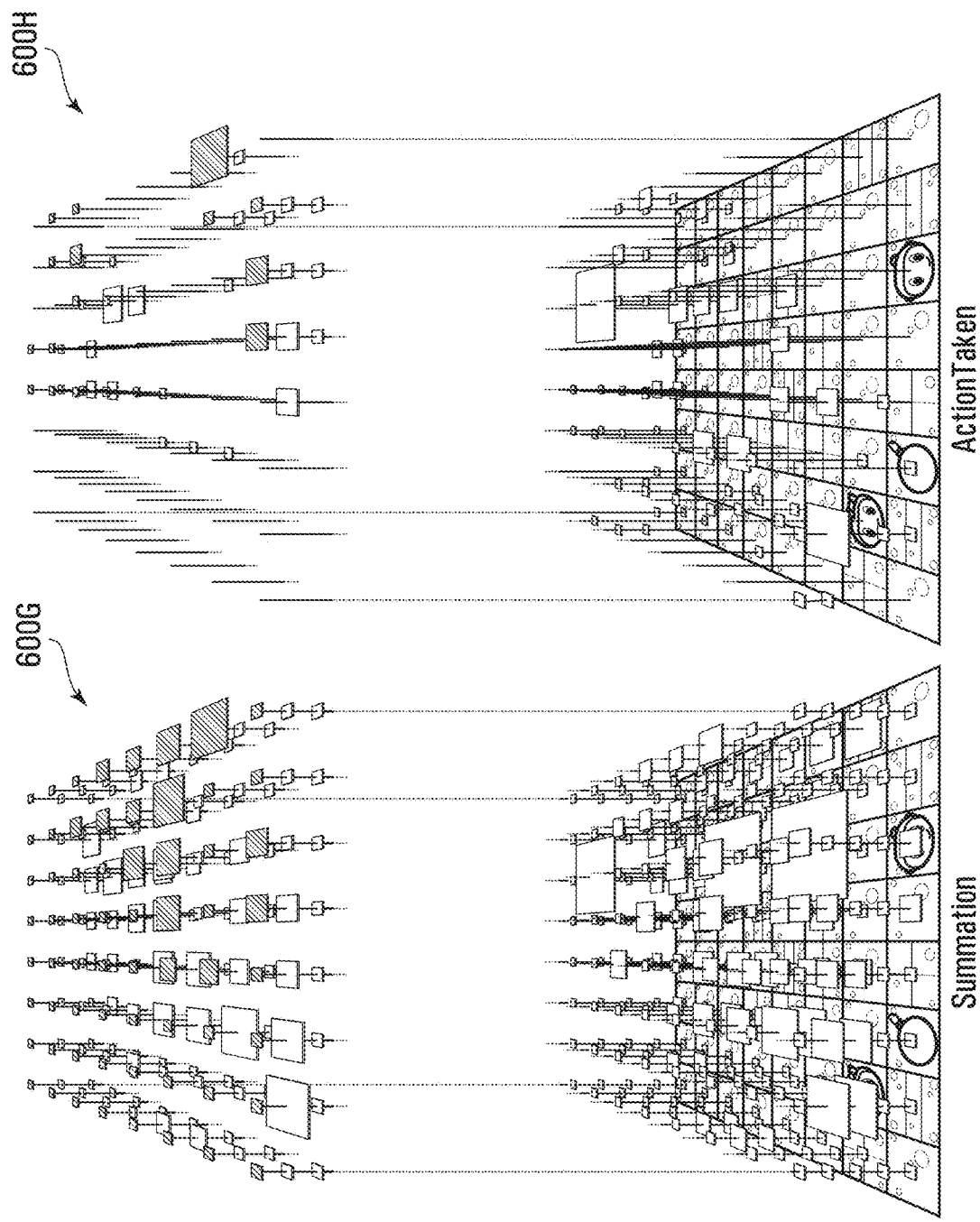

DEVICES AND METHODS FOR REINFORCEMENT LEARNING VISUALIZATION USING IMMERSIVE ENVIRONMENTS

CROSS-REFERENCE TO RELATED APPLICATIONS

This application claims all benefit including priority to U.S. Provisional Patent Application 62/881,033, filed Jul. 31, 2019, and entitled "DEVICES AND METHODS FOR REINFORCEMENT LEARNING VISUALIZATION USING IMMERSIVE ENVIRONMENTS"; the entire contents of which are hereby incorporated by reference herein.

FIELD

This disclosure relates to artificial intelligence, and more specifically to visualization of deep reinforcement learning processes.

BACKGROUND

Machine learning has, in recent years, proven able to outperform humans in different domains. However, an issue with many algorithms such as deep reinforcement learning (DRL) algorithms is that the reasoning behind their outputs can be difficult to interpret.

SUMMARY

In accordance with one aspect, there is provided a computer-implemented method for generating a visualization of a deep reinforcement learning process. The method includes: receiving state data reflective of a plurality of states of an environment explored by a deep reinforcement learning agent, each of the states corresponding to one of a plurality of successive time steps; for each given state of the plurality of states, calculating a plurality of saliency metrics by processing the state data, each of the metrics measuring saliency of one of a plurality of features of the environment at the time step corresponding to the given state; and generating a graphical visualization having at least two dimensions in which: each of the features of the environment is graphically represented along a first axis of the dimensions; and each of the time steps is represented along a second axis of the dimensions; and a plurality of graphical markers representing a corresponding one of the saliency metrics, each of the graphical markers having a size commensurate with the magnitude of the particular saliency metric represented by the graphical marker, and a location along the first and the second axes corresponding to the feature and time step for the particular saliency metric.

In accordance with another aspect, there is provided a computing device for generating a visualization of a deep reinforcement learning process. The device includes at least one processor; memory in communication with the at least one processor, and software code stored in the memory, which when executed by the at least one processor causes the computing device to: receive state data reflective of a plurality of states of an environment explored by a deep reinforcement learning agent, each of the states corresponding to a successive time step; for each given state of the plurality of states, calculate a plurality of saliency metrics by processing the state data, each of the metrics measuring saliency of one of a plurality of features of the environment at the time step corresponding to the given state; generate a graphical visualization having at least two dimensions in which: each of the features of the environment is graphically represented along a first axis of the dimensions; and each of the time steps is represented along a second axis of the dimensions; a plurality of graphical markers representing a corresponding one of the saliency metrics, each of the graphical markers having a size commensurate with the magnitude of the particular saliency metric represented by the graphical marker, and a location along the first and second axes corresponding to the feature and time step for the particular saliency metric.

In accordance with yet another aspect, there is provided a non-transitory computer-readable medium having stored thereon machine interpretable instructions which, when executed by a processor, cause the processor to perform a computer implemented method for generating a visualization of a deep reinforcement learning process. The method includes receiving state data reflective of a plurality of states of an environment explored by a deep reinforcement learning agent, each of the states corresponding to one of a plurality of successive time steps; for each given state of the plurality of states, calculating a plurality of saliency metrics by processing the state data, each of the metrics measuring saliency of one of a plurality of features of the environment at the time step corresponding to the given state; generating a graphical visualization having: at least two dimensions in which: each of the features of the environment is graphically represented along a first axis of the dimensions; and each of the time steps is represented along a second axis of the dimensions; a plurality of graphical markers representing a corresponding one of the saliency metrics, each of the graphical markers having a size commensurate with the magnitude of the particular saliency metric represented by the graphical marker, and a location along the first and second axes corresponding to the feature and time step for the particular saliency metric.

Many further features and combinations thereof concerning embodiments described herein will appear to those skilled in the art following a reading of the instant disclosure.

DESCRIPTION OF THE FIGURES

In the figures,

FIGS. 6A, 6B, 6C, 6D, 6E, 6F, 6G, and 6H are each further example graphical visualization generated by the computing device of FIG. 1, in accordance with an embodiment;

DETAILED DESCRIPTION

There is an increasing demand for the implementation of more explainable artificial intelligence (XAI). Various domain, such as, for example, medical, financial, and legal services, and the like, would benefit from improved XAI approaches to increase human acceptance and trust of the resulting decisions made by existing black-box approaches. Further, designing AI systems around humans using human-centric models may bring further benefits to embodiments by improving performance.

For example, deep reinforcement learning (DRL) has had many successes on complex tasks. DRL methods use deep neural networks as function approximators, which are known to generalize well to high-dimensional data at the cost of becoming black-boxes. Opening these black boxes may enable better understanding and trust of the model which can be helpful for researchers and end users to better interact with the learner.

The present disclosure discloses devices and methods for generating visualizations of DRL processes. Such devices and methods may be applied, in some embodiments, to enhancing the understandability of DRL processes. Such devices and methods may be applied, in some embodiments, to providing development tools such as debugging tools for creating or improving DRL agents.

Figure 1:
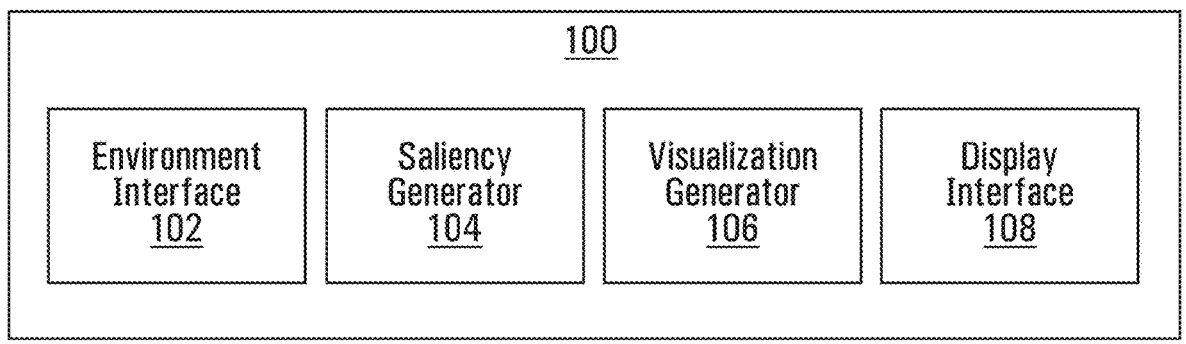
FIG. 1 is a schematic diagram of software components of a computing device adapted to generate visualizations of deep reinforcement learning processes, in accordance with an embodiment.

FIG. 1 is a schematic diagram of software components of a computing device 100 adapted to generate visualizations of deep reinforcement learning processes, in accordance with an embodiment. As depicted, device 100 includes an environment interface 102 that obtains state data of an environment with which a DRL agent is interacting; a saliency generator 104 that processes the state data obtained by environment interface 102 to generate saliency metrics, each metric measuring saliency of a particular feature of the environment at a particular time step; a visualization generator 106 that generates visualizations of saliency using the saliency metrics generated by saliency generator 104; and a display interface 108 that generates signals of generated visualizations for transmission to a display device.

Environment interface 102 is adapted to obtain state data from a variety of environments. Examples of such environments include video games, robotic or other types of automation environments, healthcare environments, financial environments such as trading platforms, and others. The functionality of computing device 100 is elaborated upon herein with reference to an example environment that is the game Pommerman, which functions as a multi-agent benchmark (https://www.pommerman.com/), being explored by a DRL agent trained using the A3C algorithm.

Figure 2:
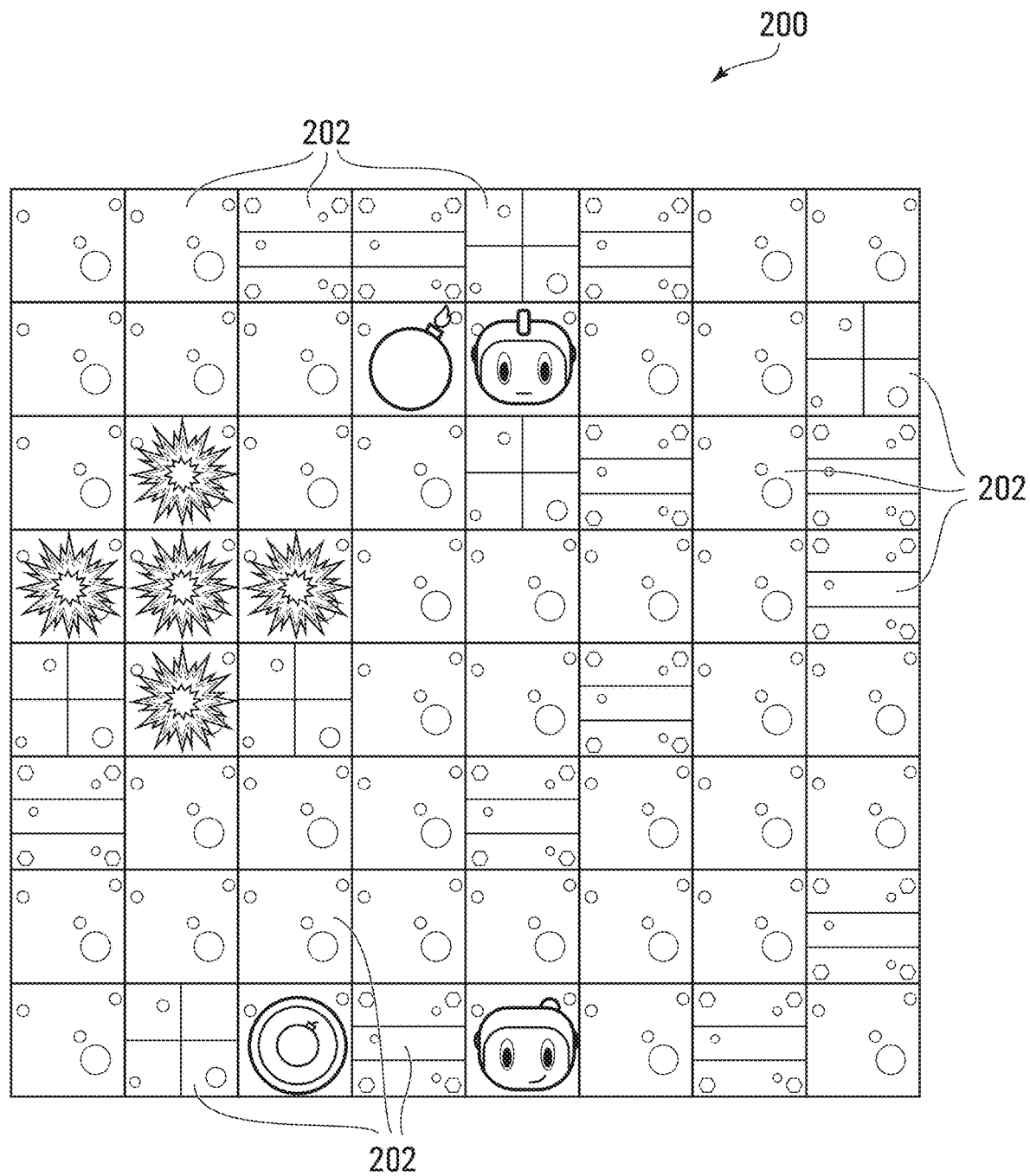
FIG. 2 is an example screen image from an example game environment.

FIG. 2 shows an example screen image from a Pommerman game. The game is played on a board 200 having a plurality of tiles 202; tiles are organized in a two-dimensional 8 by 8 grid. At each time step, players can take one of six actions: Up, Down, Left, Right, Pass, and Place a bomb.

Embodiments of saliency generator 104 apply saliency mapping techniques to generate heatmaps of important areas in a given input. These important areas correspond to areas of board 200 considered more salient to a DRL agent. In some embodiments, saliency generator 104 applies saliency algorithms that calculate salient areas based on properties of the input, e.g. based on pixel color and/or intensity in a graphical representation of the agent's environment, or other features.

In the depicted embodiment, saliency generator 104 implements a perturbation-based saliency approach to generate saliency metrics, which may be referred to herein as perturbation-based saliency metrics. This approach measures how the agent reacts to small controlled changes in the input, i.e., how the agent's policy changes in response to such changes in the input. In the depicted embodiment, the agent's policy is represented by a probability distribution over all possible actions, namely, the six actions noted above. Thus, a saliency metric is generated to reflect change in this probability distribution, for one or more of the actions, in response to controlled changes in the input.

Thus, the salient portions of an environment such as a game board can be identified to reflect the agent's interpretation of the image. This abstracted metadata about the agent's policy can then be used to visualize the agent's behaviour. This perturbation-based saliency approach includes steps described in a paper entitled "Visualizing and Understanding Atari Agents", authored by Sam Greydanus, Anurag Koul, Jonathan Dodge, and Alan Fern (2017, CoRR abs/1711.00138, http://arxiv.org/abs/1711.00138), referred to herein to as Greydanus et al., the entire contents of which are hereby incorporated by reference. As further detailed below, saliency generator 104 identifies regions of the input that are more important to the corresponding output. Abstracted metadata about the input can be visualized rather than the underlying model itself.

Figure 3:
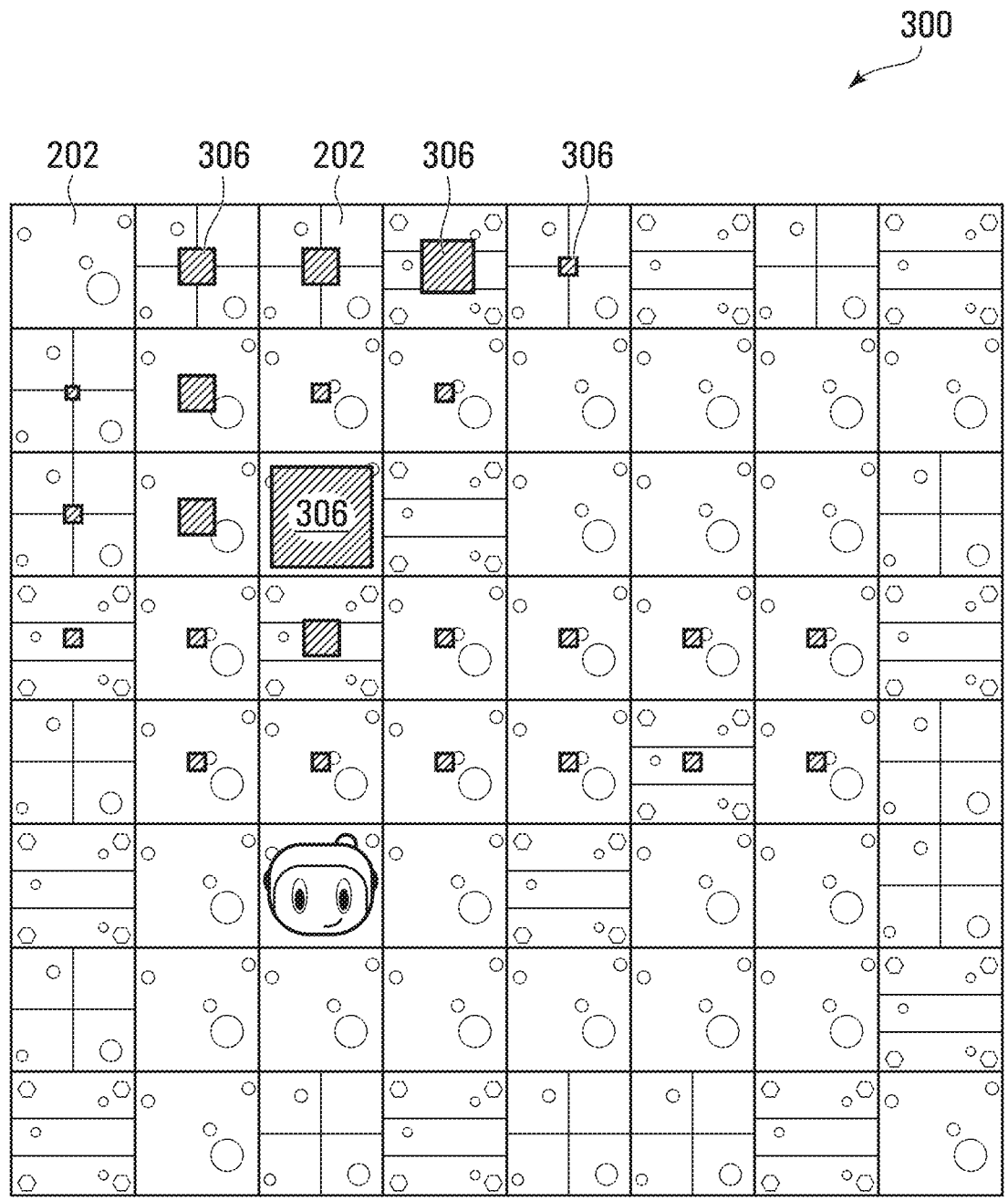
FIG. 3 is an example heatmap generated for the game environment of FIG. 2, in accordance with an embodiment.

FIG. 3 shows an example saliency heatmap overlaid on the board of a Pommerman game. A larger box 306 over a tile 202 indicates a greater saliency value while a smaller box 306 over a tile 202 indicates a lesser saliency value. Thus, the size of the box is commensurate with the magnitude of the saliency.

In some embodiments, saliency mapping implementations expect images as input, measuring or modifying the pixels to calculate the salient areas. However, in the depicted embodiment, the DRL agent takes a matrix re-creation of the game board as input rather than an image. As such, this embodiment of saliency generator 104 implements a modified version of the algorithm disclosed by Greydanus et al. to alter tiles rather than groups of pixels. For a given input, the algorithm of this embodiment first changes the categorical value of one index in the matrix to a value the agent has never seen before. This modified input is given to the agent, and the change in the agent's output is measured. This tile altering method is repeated for each tile on the board, creating a mapping of which tiles, when changed, most affected the agent's output, e.g., the agent's policy.

In the depicted embodiment, another modification made to the algorithm disclosed by Greydanus et al. is that the changes in output are recorded for each action, rather than computing the squared magnitude of the changes in all actions. Thus, several saliency maps can be generated with respect to each action the agent can take. However, the change in an action can be in the range [−1,1], so the absolute value of each change is used to normalize values in the range [0,1]. This emphasizes changes in general, at the cost of distinguishing positive and negative changes.

Figure 4:
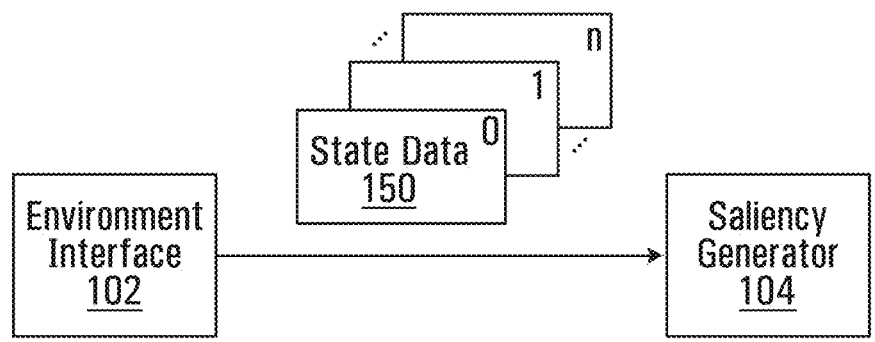
FIG. 4 is schematic diagram showing provision of state data at each time step, in accordance with an embodiment.

Visualization generator 106 generates a visualization that provides information about an agent's actions over time. Referring to an example of an agent exploring the Pommerman game, visualization generator 106 generates a visualization that provides information about an agent's actions over an entire game. A game consists of a series of consecutive, discrete time steps that finishes when the game is won or lost. As depicted in FIG. 4, at every time step (e.g., time step 0, 1 . . . N), state data is obtained at environment interface 102 and provided to saliency generator 104, which generates saliency metrics for that time step.

Figure 5A:
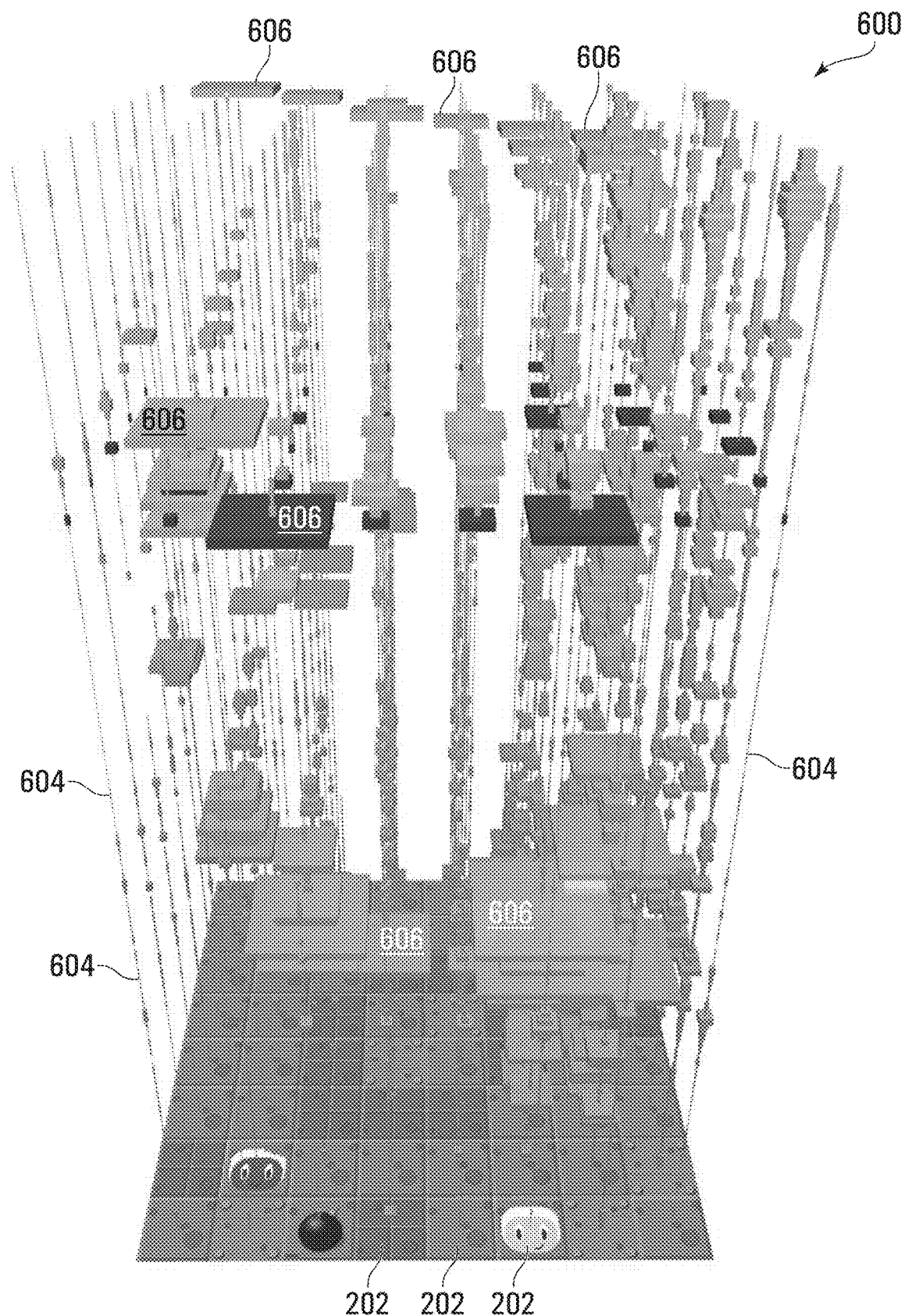
FIG. 5A is an example graphical visualization generated by the computing device of FIG. 1, in accordance with an embodiment.
Figure 5B:
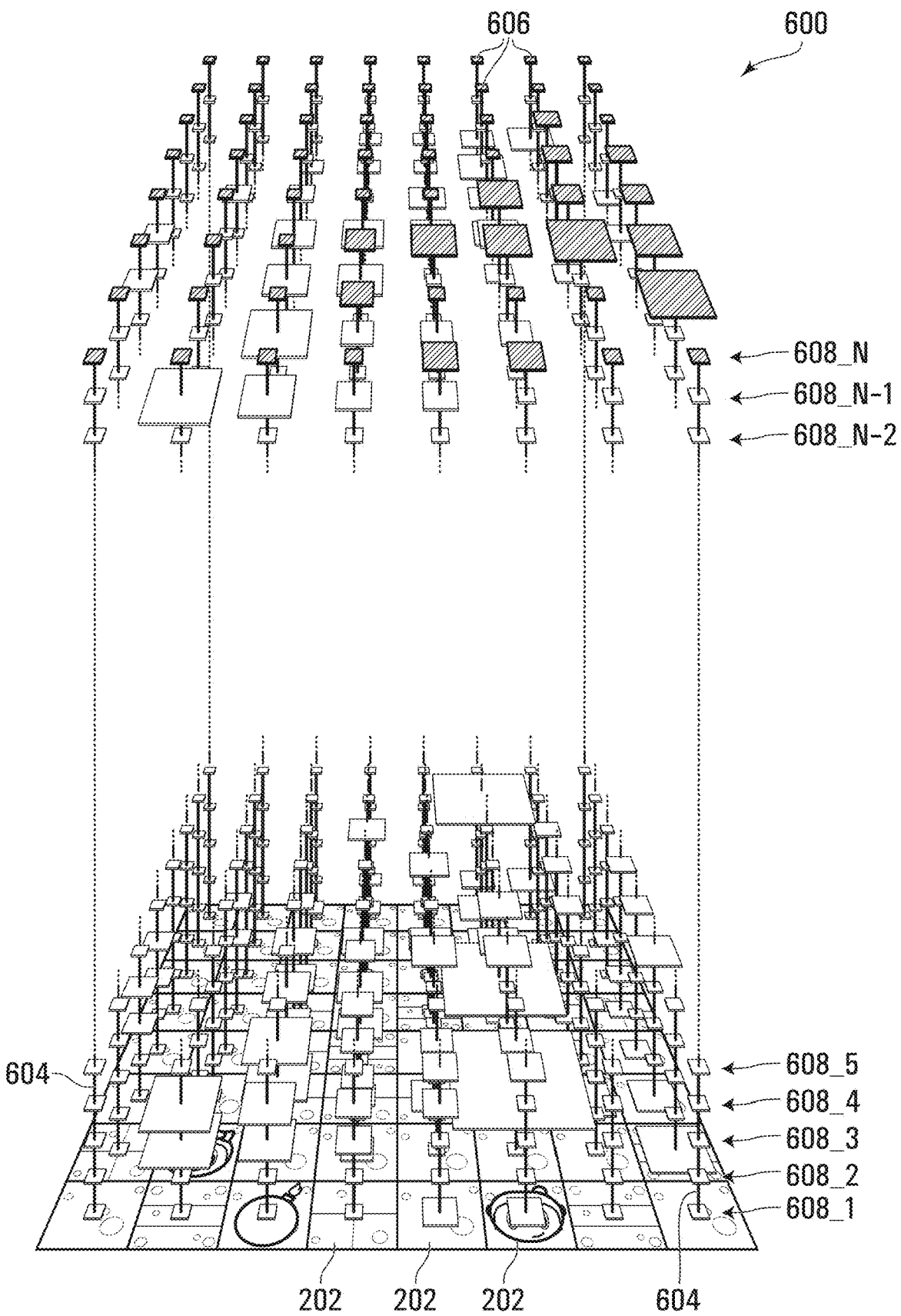
FIG. 5B is another example graphical visualization generated by the computing device of FIG. 1, in accordance with an embodiment.

FIG. 5A and FIG. 5B each depict an example visualization generated by visualization generator 106. As depicted, the visualization is a three-dimensional visualization. The visualization includes a visual representation of the game board with a plurality of tiles 202, represented along the x and y axes of the visualization. From each of the tiles 202 rises a column 604 representing changes in saliency over successive N time steps, with each time step at a particular position along the z axis.

Each column 604 includes N levels, e.g., depicted as levels 608_1, 608_2, . . . 608_N−1, and 608N in FIG. 5B. Each level has a particular position along the z axis, which is representative of a particular time step. In FIG. 5B, levels between 608_5 and 608_N−2 have been omitted to improve clarity of depiction.

Each level include a plurality of graphical markers 606, each representing a saliency metric calculated for a particular tile (i.e., the tile 202 from which the column 604 rises) and the particular time step represented by the level of the graphical marker 606 (i.e., the time step at the height of the graphical marker 606).

Each graphical marker 606 has the shape of a rectangular prism, and thus may also be referred to herein as a prism 606. Each graphical marker 606 has a size commensurate with the magnitude of the saliency metric represented by that marker 606. Due to the shape of the arrangement of graphical markers 606, each set of graphical markers 606 in a visualization may be referred to herein as a tower 600.

For the visualizations of FIG. 5A and FIG. 5B, the saliency metric is calculated by applying a summation operator to the action distribution of the DRL agent's policy, i.e., by summing the change in the policy across all possible actions. For this reason, each of the towers depicted in FIG. 5A and FIG. 5B may be referred to herein as a "summation tower." The summation may be weighted based on the likelihood of each action.

As detailed below with reference to FIGS. 6A-6H, visualizations of towers with saliency metrics calculated for particular actions may also be generated. Further, in other embodiments, other operators may applied instead of a summation operator. Examples of such other operators include average, maximum, minimum, or the like.

Generation of a visualization of tower 600 uses data recorded over a given game spanning a plurality of time steps from game start to game end. At the bottom of tower 600 is a visual representation of the game board that functions as the foundation of tower 600. On top of the board, a saliency map is generated by creating a level (along a plane) of rectangular prisms 606, one prism 606 for each tile 202 on the game board. Each prism 606 has a constant height and has width and length scaled to equate to the saliency value for the tile underneath it. Each tile 202 has a saliency value in the range [0,1] and is thus used as a linear scale of the prism's dimensions. This saliency map creation process is then repeated for each state in the game (corresponding to each time step), each creating another level of prisms immediately above the last.

Additionally, a particular level of tower 600 (e.g., one of levels 608_1 through 608_N), corresponding to a particular time step, can be selected by the user which causes prisms 606 for that time step to be highlighted. For example, in FIG. 5B, level 608_N has been user selected, causing all prisms 606 at that level to be displayed with a different colour.

So, a user selection of the time steps can be received, which causes the visualization of tower 600 to be updated to modify the appearance of the graphical markers at this time step. The board at the bottom of the tower 604 also changes to represent the environment during that time step. A user may provide input to progress backwards or forwards in time steps (e.g., by pressing the left and right arrow keys on a keyboard, by swiping left and right on a touch screen, etc.). Visualization generator 106 receives signals reflective of such user input and processes such signals to update the visualization to reflect the selected time step.

Structured this way, a visualization generated by visualization generator 106 can provide a large amount of information to the user. Seeing multiple maps (levels) allows users to identify what the DRL agent identifies as important areas of the game's environment and also compare how those areas change over time.

Figures 6A, 6B:
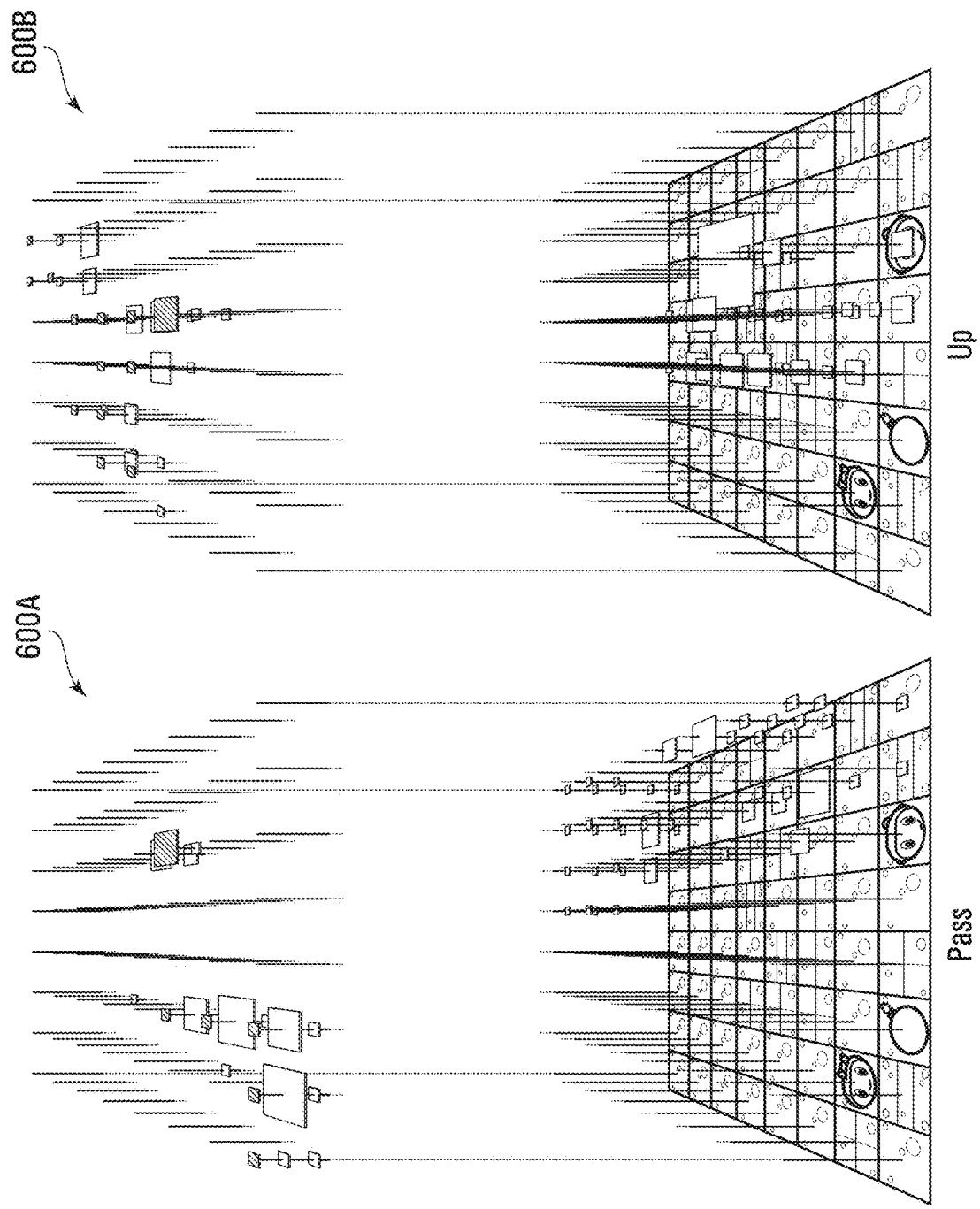

Further, saliency data is recorded with respect to each action the agent can take. Accordingly, multiple towers can be generated using the saliency data of different actions, with each tower generated to show saliency metrics calculated for a particular action. FIGS. 6A-6F each show an example visualization of a tower generated for a particular action. Specifically, FIG. 6A shows tower 600A generated to show saliency metrics for the "Pass" action. Similarly, FIG. 6B shows a tower 600B for the "Up" action; FIG. 6C shows a tower 600C for the "Down" action; FIG. 6D shows a tower 600D for the "Left" action; FIG. 6E shows a tower 600E for the "Right" action; and FIG. 6F shows a tower 600F for the "Bomb" action.

FIG. 6G shows a tower 600G reflective of a summation operator applied across the actions shown in FIG. 6A-6F.

FIG. 6H shows a tower 600H including a tower generated to show saliency metrics for the action taken by the DRL agent at each particular time step, in accordance with the DRL agent's policy.

Similarly to FIG. 5B, in FIGS. 6A-6H levels between 608_5 and 608_N−2 of each other have been omitted to improve clarity of depiction.

Display interface 108 is adapted to generate and send signals representative of generated visualizations to a display (e.g., a screen). In some embodiments, display interface 108 is configured for signaling to a display screen suitable for displaying two-dimensional images or two-dimensional representations of three-dimensional scenes.

In some embodiments, display interface 108 is adapted to generate and send signals representative of generated visualizations to a head-mounted display (HMD), which shows users three-dimensional images of an immersive virtual environment. The HMD may, for example, be part of a virtual reality, augmented reality, or mixed reality system.

In some embodiments, users can view and interact with visualizations using an HMD and one or more controllers configured to receive user input. Such controllers may, for example, include one or more handheld controllers (e.g., in a pair) of a virtual reality, augmented reality, or mixed reality system. Computing device 100 may receive signals corresponding to user input from one or more such handheld controllers. In one particular embodiment, computing device 100 communicates with a HMD and controllers by way of an OpenVR interface.

Figure 7:
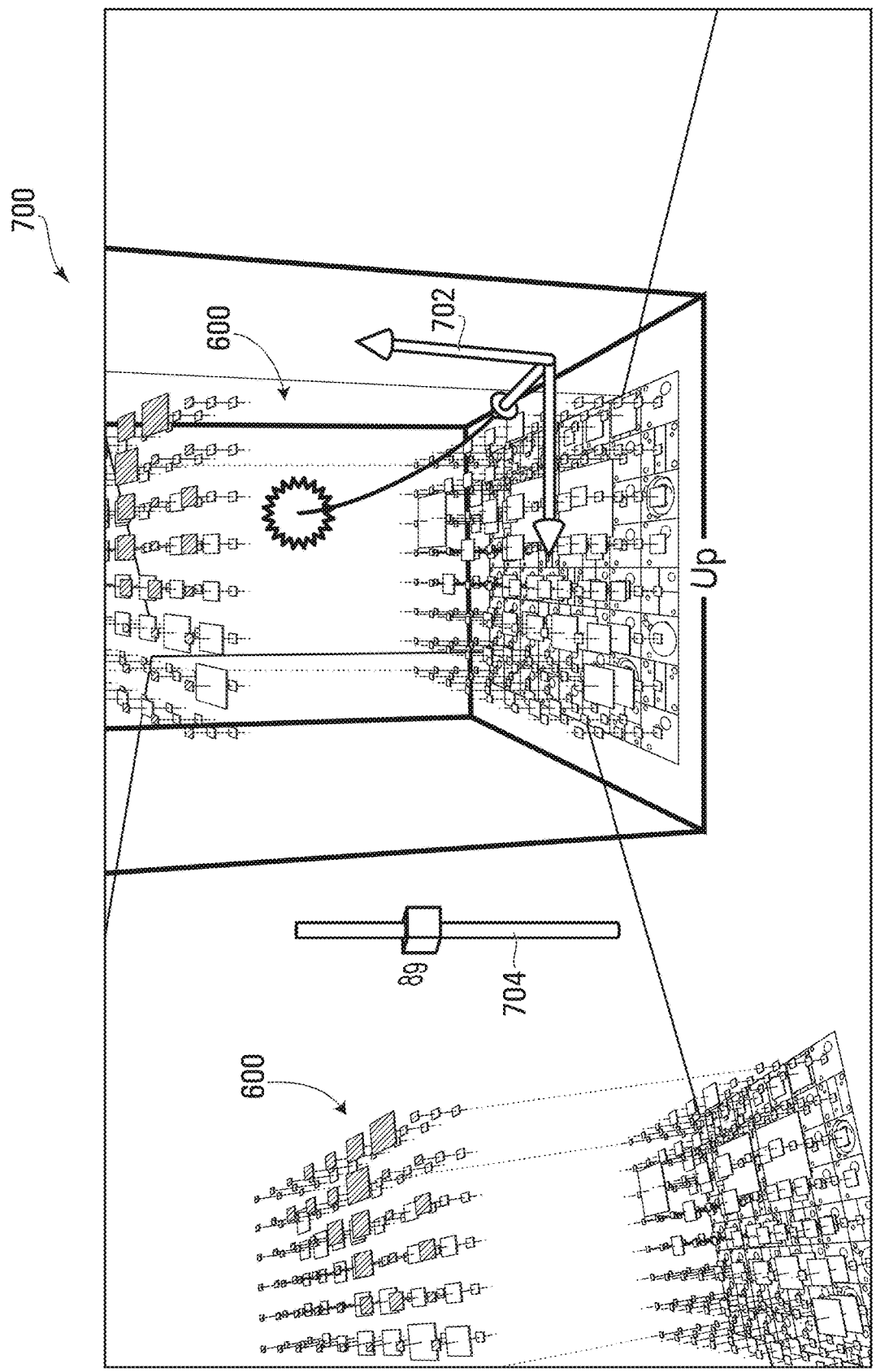
FIG. 7 is an example view of graphical visualizations generated by the computing device of FIG. 1, as presented via a head-mounted display of an interconnected virtual reality system, in accordance with an embodiment.

FIG. 7 depicts a graphical visualization generated by display interface 108 for display at a HMD of a virtual reality system, in accordance with an embodiment.

As depicted, the graphical visualization includes a representation of a virtual environment 700. Within virtual environment 700, which may be represented as a virtual room with a walls, a floor, a ceiling, and the like. Users can walk around to view various towers 600. For example, virtual environment 700 may include a plurality of towers, e.g., including each of the towers shown in FIG. 6A-6H. In the depicted embodiment, each tower 600 has an approximate size of one square meter wide and two meters tall.

Similarly to FIG. 5B, in FIG. 7 levels between 608_5 and 608_N−2 of each tower have been omitted to improve clarity of depiction.

The graphical visualization includes a cursor 702 having a position and orientation corresponding to a handheld controller of the virtual reality system. Virtual environment 700 is configured to permit user manipulation of certain aspects via cursor 702.

For example, a tower 600 can be selectively moved within virtual environment 700 (e.g., by drag-and-drop user input) to allow users to customize how visualizations can be viewed. As depicted, a tower 600 for the "Up" action has been selected via cursor 702, causing a box to be drawn around this tower 600.

Further, the current time step can be selected by the user by manipulating slider 704 via cursor 702. As depicted, time step 89 has been selected.

Conveniently, display graphical visualizations generated by device 100 using immersive technologies provides an extra dimension in space to assist in user understanding given spatial context, as well as removing the space limitation of computer screens.

Each of environment interface 102, saliency generator 104, visualization generator 106, and display interface 108 may be implemented using conventional programming languages such as Java, J #, C, C++, C #, Perl, Visual Basic, Ruby, Scala, etc. These components of system 100 may be in the form of one or more executable programs, scripts, routines, statically/dynamically linkable libraries, or servlets. Aspects of display interface 108 may be implemented using GPU optimizations.

Figure 8:
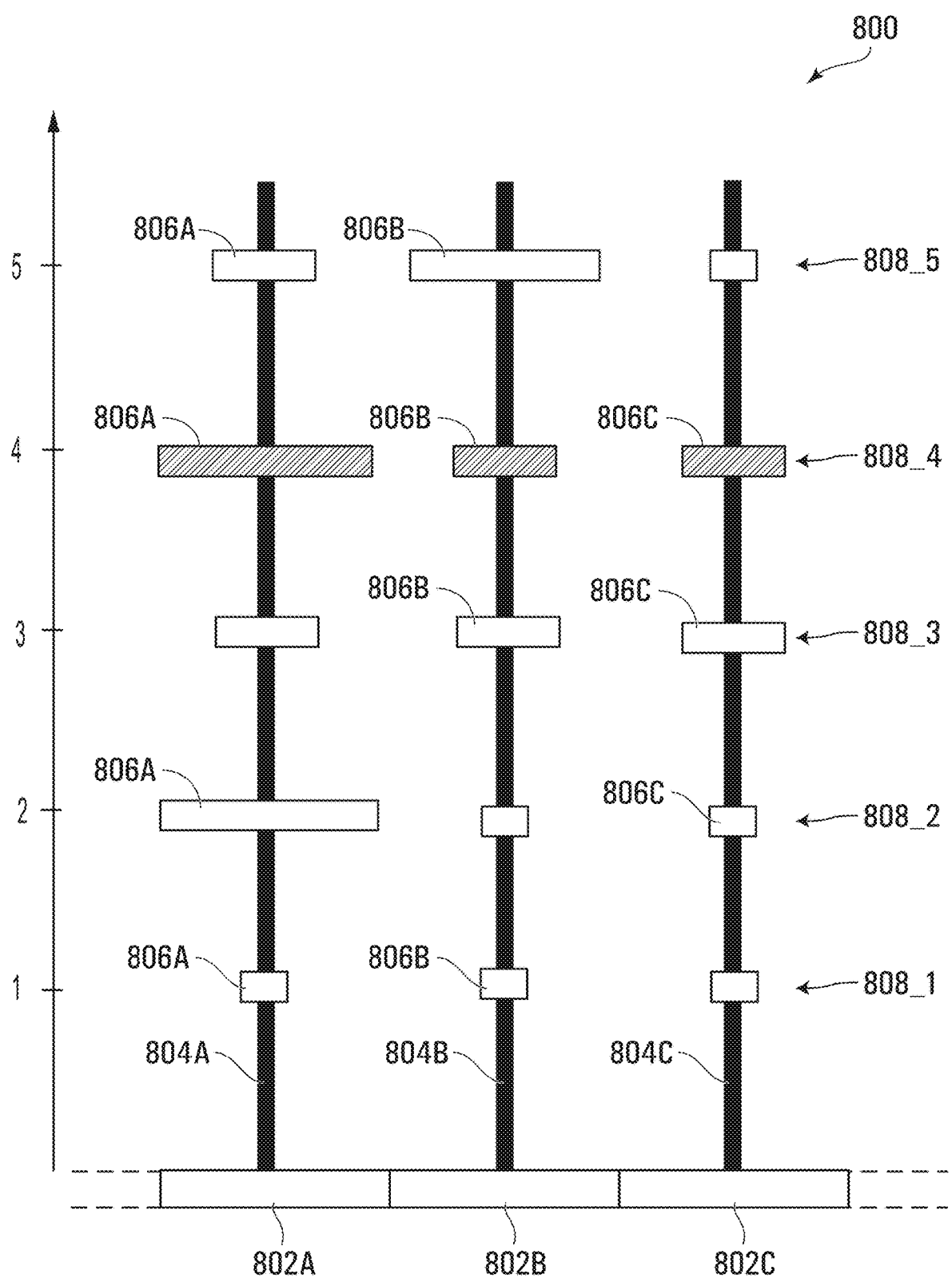
FIG. 8 is yet another example graphical visualization generated by the computing device of FIG. 1, in accordance with an embodiment.

FIG. 8 depicts a graphical visualization generated by visualization generator 106, in accordance with another embodiment. As depicted, the graphical visualization includes tiles 802A, 802B, and 802C, corresponding respectively to three inputs. Each of these tiles has a corresponding column extending therefrom, i.e., respectively, columns 804A, 804B, 804C. Each of the columns has a plurality of rectangular graphical markers, respectively, markers 806A, 806B, and 806C. These markers are placed at levels 808_1, 808_2, 808_3, 808_4, 808_5, and so on, which correspond respectively to time steps 1, 2, 3, 4, 5, and so on.

As depicted, level 808_4 has been selected by the user, causing the markers at time step 4 to be distinguished visually (e.g., having a different colour or intensity than other markers).

In the depicted embodiment, the graphical markers are sized according to the absolute value of the saliency metrics, which are in the range [−1, 1]. In another embodiment, negative and positive values of saliency metrics may be distinguished visually (e.g., by changing the color, shape, or other visual characteristic of the graphical markers).

In the embodiments discussed above, visualizations are generated for fixed, discrete time steps. This allows display of planes of graphical markers that are all of an equal height. In other embodiments, visualizations may be generated for discrete time steps of varying length. In yet other embodiments, visualizations may be generated having a continuous time axis.

Figure 9:
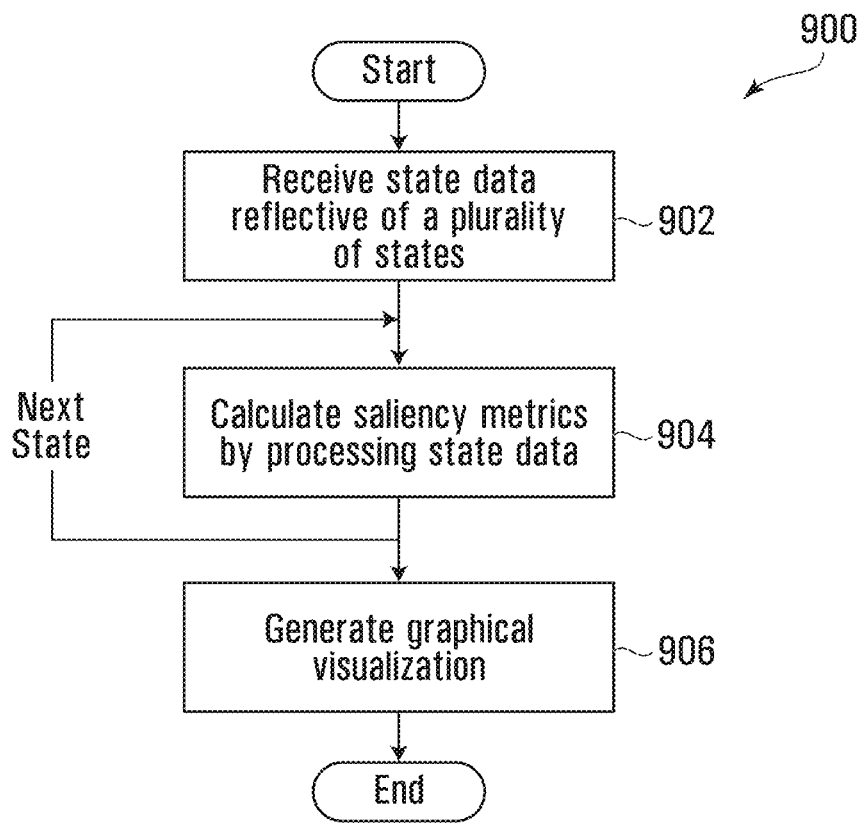
FIG. 9 is a flowchart showing example operation of the computing device of FIG. 1, in accordance with an embodiment.

The operation of computing device 100 to generate a visualization of a deep reinforcement learning process is further described with reference to the flowchart depicted in FIG. 9. In this depicted example operation, device 100 performs the operations depicted at blocks 900 and onward, in accordance with an embodiment.

At block 902, environment interface 102 receives state data reflective of a plurality of states of an environment explored by a deep reinforcement learning agent. Each of the states corresponds to one of a plurality of successive time steps.

At block 904, saliency generator calculates a plurality of saliency metrics by processing the state data. Each of the saliency metrics measures saliency of one of a plurality of features of the environment at the time step corresponding to the given state. This is repeated for each state of the plurality of states.

At block 904, visualization generator 106 generates a graphical visualization having at least two dimensions in which: each of the features of the environment is graphically represented along a first axis of the dimensions; and each of the time steps is represented along a second axis of the dimensions. The graphical visualization also has a plurality of graphical markers representing a corresponding one of the saliency metrics, each of the graphical markers having a size commensurate with the magnitude of the particular saliency metric represented by the graphical marker, and a location along the first and second axes corresponding to the feature and time step for the particular saliency metric.

It should be understood that steps of one or more of the blocks may be performed in a different sequence or in an interleaved or iterative manner. Further, variations of the steps, omission or substitution of various steps, or additional steps may be considered.

For example, once a graphical representation has been generated by visualization generator 106, display interface 108 generates and sends signals representative of the graphical representation for display, e.g., at a head-mounted display. Further, visualization generator 106 may receive signals corresponding to user input, and may re-generate or otherwise update the graphical representation in response to such user input. Such user input may, for example, be a user selection of one of the time steps. In this case, visualization generator 106 updates the graphical visualization to modify an appearance of the graphical markers representing saliency metrics for the selected time step.

Although computing device 100 has been described with reference to a Pommerman game with a two-dimensional game space (a flat game board), the devices and methods disclosed herein may be applied to other games, including games with a three-dimensional game environment (e.g., a driving simulator or a first-person perspective shooting game). For example, the two-dimensional game board in the visualization may be replaced by a two-dimensional representation (e.g., a two-dimensional map) of a three-dimensional game environment.

In some embodiments, the saliency visualization generator disclosed herein may be incorporated into an artificial intelligence development tool such as a debugging tool for creating or improving DRL agents. For example, a user may step through execution time steps in a generated visualization as part of a debugging process.

In some embodiments, the devices and methods disclosed herein may be applied to an electronic financial environment including a trading platform for securities (e.g., stocks, bonds, options or other negotiable financial instruments). In such embodiments, the DRL agent interacting with the environment may be a trading agent. In such embodiments, the features for which saliency is generated may include various features relevant to a trading platform for securities. Each feature may, for example, represent an aspect of a state of the trading market, or an aspect of a state of the DRL agent. For example, features may be extracted from market data received from the trading platform, and labeled to have semantic meaning. Examples of such features include past prices, current prices, volatility, and the like.

In such embodiments, saliency generator 104 generates saliency metrics from features relevant to a trading platform, e.g., by perturbing the features. For example, a feature can be perturbed by computing a historical mean and setting the value of that feature to this mean.

In some embodiments, saliency generator 104 generates saliency metrics by calculating metrics reflective of change in level of aggression of a trading agent caused by a perturbation.

For example, the summation operator described above may be replaced by an operator that includes calculating a measure of aggression across various possible actions available to the trading agent. In one example, a low level of aggression may be attributed to an action that does nothing while a high level of aggression may be attributed to an action that crosses the spread. The aggression operator can be implemented to include a weighted sum across available actions, with weights assigned based on the aggression level attributed to each action. The output of this aggression operator may be referred to as an "aggression" score that reflects a level of aggression.

Visualization generator 106 generates visualizations of towers depicting saliency of various features relevant to a trading platform.

In the embodiments discussed above, saliency generator 104 implements a perturbation-based saliency approach to generate saliency metrics. In other embodiments, saliency generator 104 may implement a gradient-based approach to generate saliency metrics, which may be referred to herein as gradient-based saliency metrics.

Figure 10:
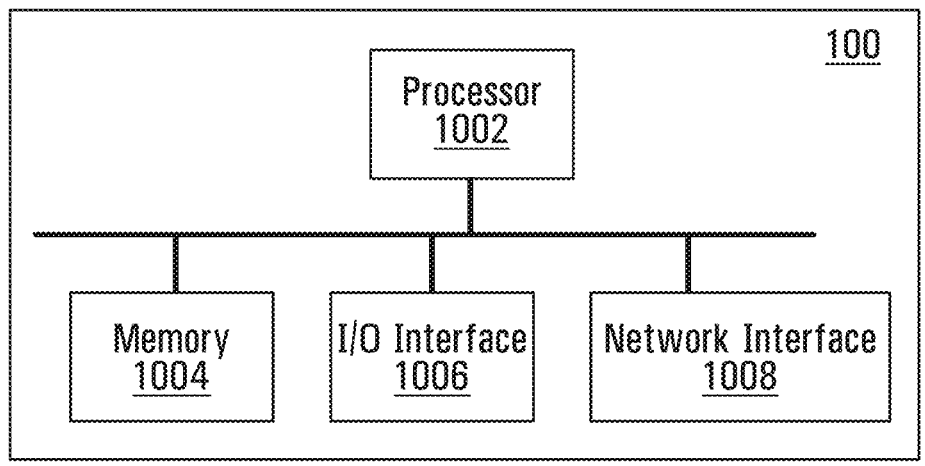
FIG. 10 a hardware schematic diagram of the computing device of FIG. 1, in accordance with an embodiment.

FIG. 10 is a schematic diagram of hardware components of computing device 100, in accordance with an embodiment. As depicted, computing device 100 includes one or more processors 1002, memory 1004, one or more I/O interfaces 1006, and, optionally, one or more network interface 1008.

Each processor 1002 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 1004 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 1004 may store code executable at processor 1002, which causes device 100 to function in manners disclosed herein.

Each I/O interface 1006 enables computing device 100 to interconnect with one or more input devices, such as a keyboard, mouse, controller, camera, touch screen and a microphone, or with one or more output devices such as a display screen (e.g., in cooperation with display interface 108) and a speaker. For example, I/O interface 1006 may enable computing device 100 to interconnect with one or more handheld controllers, e.g., of a virtual reality, augmented reality, or mixed reality system.

Each network interface 1008 enables computing device 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The methods disclosed herein may be implemented using a system that includes multiple computing devices 100. The computing devices 100 may be the same or different types of devices. Each computing devices may be connected in various ways including directly coupled, indirectly coupled via a network, and distributed over a wide geographic area and connected via a network (which may be referred to as "cloud computing").

For example, and without limitation, each computing device 100 may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The embodiments and examples described herein are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A computer-implemented method for generating a visualization of a deep reinforcement learning process, the method comprising:
    receiving state data reflective of a plurality of states of an environment explored by a deep reinforcement learning agent, each of the states corresponding to one of a plurality of successive time steps;
    for each given state of the plurality of states, calculating a plurality of saliency metrics by processing the state data, each of the metrics measuring saliency of one of a plurality of features of the environment at the time step corresponding to the given state;
    generating a graphical visualization having:
        at least two dimensions in which: each of the features of the environment is graphically represented along a first axis of said dimensions; and each of the time steps is represented along a second axis of said dimensions;
        a plurality of graphical markers representing a corresponding one of the saliency metrics, each of the graphical markers having a size commensurate with the magnitude of the particular saliency metric represented by the graphical marker, and a location along the first and second axes corresponding to the feature and time step for the particular saliency metric.

2. The computer-implemented method of claim 1, further comprising:
    sending signals representing the generated graphical visualization for display at a head-mounted display.

3. The computer-implemented method of claim 1, further comprising:
    receiving signals representing user input from a handheld controller of a virtual reality, augmented reality, or mixed reality system.

4. The computer-implemented method of claim 1, wherein the plurality of saliency metrics includes perturbation-based saliency metrics.

5. The computer-implemented method of claim 1, wherein the plurality of saliency metrics includes gradient-based saliency metrics.

6. The computer-implemented method of claim 1, wherein said calculating the plurality of saliency metrics includes determining a change in a policy of the deep reinforcement learning agent.

7. The computer-implemented method of claim 1, wherein the graphical visualization has three dimensions, and each of the features is represented along two axes of said dimensions.

8. The computer-implemented method of claim 7, wherein the graphical markers are organized into a plurality of levels, with each of the levels representative of one of the time steps.

9. The computer-implemented method of claim 7, wherein each of the plurality of graphical markers has a three-dimensional shape.

10. The computer-implemented method of claim 1, further comprising:
receiving a user selection of one of the time steps;
updating the graphical visualization to modify an appearance of the graphical markers representing saliency metrics for the selected time step.

11. The computer-implemented method of claim 1, wherein the graphical visualization further comprises a graphical representation of the environment.

12. The computer-implemented method of claim 11, wherein the graphical representation of the environment includes a virtual room.

13. The computer-implemented method of claim 1, the environment includes a platform for trading securities and the agent is a trading agent.

14. The computer-implemented method of claim 13, wherein said calculating the plurality of saliency metrics includes calculating metrics reflective of a level of aggression of the trading agent.

15. A computing device for generating a visualization of a deep reinforcement learning process, the device comprising:
at least one processor;
memory in communication with the at least one processor, and
software code stored in the memory, which when executed by the at least one processor causes the computing device to:
receive state data reflective of a plurality of states of an environment explored by a deep reinforcement learning agent, each of the states corresponding to a successive time step;
for each given state of the plurality of states, calculate a plurality of saliency metrics by processing the state data, each of the metrics measuring saliency of one of a plurality of features of the environment at the time step corresponding to the given state;
generate a graphical visualization having:
at least two dimensions in which: each of the features of the environment is graphically represented along a first axis of the dimensions; and
each of the time steps is represented along a second axis of the dimensions;
a plurality of graphical markers representing a corresponding one of the saliency metrics, each of the graphical markers having a size commensurate with the magnitude of the particular saliency metric represented by the graphical marker, and a location along the first and second axes corresponding to the feature and time step for the particular saliency metric.

16. The device of claim 15, further comprising a display interface for interconnection with a head-mounted display.

17. The device of claim 15, further comprising an I/O interface for interconnection with a handheld controller.

18. The device of claim 16, wherein the at least one processor further causes the computing device to transmit signals corresponding to the generated graphical visualization to the head-mounted display by way of the display interface.

19. The device of claim 16, wherein the head-mounted display is part of a virtual reality, augmented reality, or mixed reality system.

20. A non-transitory computer-readable medium having stored thereon machine interpretable instructions which, when executed by a processor, cause the processor to perform a computer implemented method for generating a visualization of a deep reinforcement learning process, the method comprising:
receiving state data reflective of a plurality of states of an environment explored by a deep reinforcement learning agent, each of the states corresponding to one of a plurality of successive time steps;
for each given state of the plurality of states, calculating a plurality of saliency metrics by processing the state data, each of the metrics measuring saliency of one of a plurality of features of the environment at the time step corresponding to the given state;
generating a graphical visualization having:
at least two dimensions in which: each of the features of the environment is graphically represented along a first axis of said dimensions; and each of the time steps is represented along a second axis of said dimensions;
a plurality of graphical markers representing a corresponding one of the saliency metrics, each of the graphical markers having a size commensurate with the magnitude of the particular saliency metric represented by the graphical marker, and a location along the first and second axes corresponding to the feature and time step for the particular saliency metric.

* * * * *